(12) United States Patent
Spadone

(10) Patent No.: US 7,335,707 B2
(45) Date of Patent: Feb. 26, 2008

(54) BARRIER LAYER COMPOSITION

(75) Inventor: Leighton Randolph Spadone, Beachwood, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 282 days.

(21) Appl. No.: 11/264,861

(22) Filed: Nov. 2, 2005

(65) Prior Publication Data

US 2007/0100030 A1    May 3, 2007

(51) Int. Cl.
*C08F 8/32*    (2006.01)
(52) U.S. Cl. .................... 525/332.7; 525/374; 525/377
(58) Field of Classification Search ............. 525/332.7, 525/374, 377
See application file for complete search history.

(56) References Cited

U.S. PATENT DOCUMENTS

| | | | |
|---|---|---|---|
| 2,676,636 A | | 4/1954 | Sarbach |
| 2,690,780 A | * | 10/1954 | Cousins ...................... 152/511 |
| 4,324,870 A | | 4/1982 | Rim et al. |
| 4,574,140 A | | 3/1986 | Sandstrom et al. |
| 4,790,365 A | | 12/1988 | Sandstrom et al. |
| 5,005,625 A | | 4/1991 | Klemmensen et al. |
| 5,008,337 A | | 4/1991 | Patel |
| 5,178,702 A | | 1/1993 | Frerking, Jr. et al. |
| 5,292,590 A | | 3/1994 | Lin et al. |
| 5,576,376 A | * | 11/1996 | Shibata et al. ............... 524/495 |
| 5,610,240 A | | 3/1997 | Hogt et al. |
| 5,623,007 A | | 4/1997 | Kuebler |
| 5,925,702 A | | 7/1999 | Hecker et al. |
| 6,079,468 A | | 6/2000 | D'Sidocky et al. |
| 6,136,123 A | | 10/2000 | Kaido et al. |
| 6,156,143 A | | 12/2000 | Maly et al. |
| 6,207,752 B1 | | 3/2001 | Abraham et al. |
| 6,355,317 B1 | | 3/2002 | Reid et al. |
| 6,386,255 B1 | | 5/2002 | Majumdar et al. |
| 6,402,867 B1 | | 6/2002 | Kaido et al. |
| 6,476,109 B1 | | 11/2002 | Wideman et al. |
| 6,528,592 B1 | | 3/2003 | Wideman et al. |
| 6,706,789 B2 | | 3/2004 | Ddamulira et al. |

OTHER PUBLICATIONS

Carter et al., *Pneumatic Tire and Innerliner and Method For Manufacture*, U.S. Statutory Invention Registration No. US H2068 H, Jul. 1, 2003.
Elgem Technology, *Novor 950*, web site www.elgemtechnology.com, Aug. 16, 2005.

* cited by examiner

*Primary Examiner*—Bernard Lipman
(74) *Attorney, Agent, or Firm*—Wood, Herron & Evans

(57) ABSTRACT

A barrier layer composition for a pneumatic tire that contains a mixture of an 4-phenyl isocyanate and sulfur as a crosslinking material, with higher than normal levels of filler or reinforcing material loading. The barrier layer formulation exhibited improved green strength properties, and also improved aged flex life, aged tear, and reversion resistance.

16 Claims, No Drawings

BARRIER LAYER COMPOSITION

FIELD OF THE INVENTION

Described herein is a method and composition for improving green strength while maintaining cured flex life properties in a rubber composition for manufacturing a barrier layer for incorporation into a pneumatic tire.

BACKGROUND OF THE INVENTION

In various pneumatic tire constructions, including but not limited to bias ply tires used for a variety of applications, as well as radial ply tires used for aircraft applications, military applications, OTR (off-the-road) applications, Passenger, and RMT (radial-medium-truck) applications, a barrier typically comprises a component layer of the tire. The barrier may constitute a single layer among the various layers assembled to form a tire, but several layers may also act in combination as a barrier.

The innerliner typically is the innermost layer or combination of layers in the assembled tire. Over the service life of a tire, the innerliner becomes susceptible to cracking or breaching at one or more points along the innerliner surface as a result of interactions with adjacent layers within the tire assembly. The innerliner is normally prepared by conventional calendaring or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

Particularly, there is a risk that movement of a ply layer adjacent to the innerliner over the service life of the tire relative to the innerliner could cause a breaching of the innerliner layer in service, thereby permitting movement of air and water through the innerliner.

To minimize the risk of innerliner breach in this manner, a barrier layer is commonly interposed between the innerliner and ply layers. Where the ply layer is typically formulated from a high modulus rubber, and the innerliner a low modulus halobutyl rubber, the barrier layer typically is prepared using an intermediate modulus rubber. The barrier layer functions as a pad to buffer the physical contacts between the ply and innerliner layers, and to reduce stresses between these layers.

In serving this function, the barrier gauge, or thickness, must be sufficiently high to continue to provide this buffering effect during manufacturing and the service life of the tire. The desired cured barrier thickness must be maintained both during the building and shaping of the uncured barrier and tire as well as during the tire curing process. In certain tire end use applications, such as OTR, tremendous stresses can be experienced in the vicinity of the barrier layer. Because insufficient gauge of the barrier layer may result in potential damage to the innerliner and reduce the tire durability, it is important that the barrier layer in the cured tire maintain sufficient thickness in the manufacturing process to reduce the risk of damage to the innerliner in service.

One of the measures of the tendency of the barrier layer to deform or to flow in the uncured state under shaping and curing stresses is the green strength. In elastomers which possess poor green strength the yield stress which the unvulcanized elastomer exhibits during deformation is low and the stress drops off quite rapidly as the deformation continues. Unvulcanized strips or other forms of such elastomers often pull apart during building operations. Also, the gauge of the green barrier component can be reduced by shaping and curing pressure stresses. Green strength is typically quantified in terms of the stress/strain curves of the unvulcanized elastomer. Usually, the performance of a green compound (unvulcanized) is based upon two points of the stress/strain curve, namely the first peak or yield point and the ultimate or breaking tensile point. Improvement in either of these stress/strain properties indicates improved green strength.

Numerous additives and increased loading of carbon black, silica, or both in the composition have been utilized in association with various elastomeric mixture modifications to improve green strength. However, the utilization of such methods to improve green strength commonly causes unwanted results, such as reduction in component to component adhesion or the loss of flex life of the compounded elastomeric mixture. For various reasons, the incorporation of additives into elastomers in order to improve green strength has generally not proven to be completely satisfactory. Electron beam precure is a technique which has gained wide commercial acceptance as a means of improving the green strength of elastomers. For instance, electron beam precure is widely used in the tire industry to improve the green strength of elastomers utilized in building tires. However, electron beam precure techniques are costly, due in part to complex handling equipment requirements and isolation of the electron beam energy and its byproducts. Nevertheless, electron beam precure often represents the only acceptable means for providing adequate green strength to maintain dimensional stability during tire building and curing procedures without adversely affecting the desired cured component (barrier) properties like flex life.

There remains a need especially for individual barrier layers of a tire to have good green strength to maintain green and cured gauge during the tire building and curing processes without resorting to increasing the barrier gauge, with the associated weight and cost gains, and also to maintain good flexibility post-cure to achieve maximum service life.

SUMMARY OF THE INVENTION

It has been found that barrier layers having good green strength and good post-cure flexibility, as determined by flex life measurements, can be formulated with incorporation of elevated levels of fillers, reinforcing materials, or both in the presence of one or more carbon-carbon crosslinking acceleration materials in combination with a sulfur crosslinking material into rubber which is then formed into the barrier layer.

The filler, or reinforcing material, is typically carbon black, but may be silica, or mixtures of both carbon black and silica. The selection of the particular carbon black or silica to attain other desired properties in the finished tire is known to those having skill in the art. Carbon black or silica may be incorporated into the barrier layer formulation at levels as low as 10 to 15 phr, though incorporation levels are more typically in the range of 40 to 80 phr. To accomplish improved green strength, however, the concentration of carbon black, silica, or mixtures thereof is increased, being in the range of 60 to 80 phr.

Typically, an increase in the carbon black concentration, though beneficial in improving green strength, has an adverse effect on the flexibility and adhesion of this component in the cured tire. A barrier layer with reduced flex life can reduce tire durability in adverse operating conditions, when it can directly expose the relatively fragile innerliner layer to the operating stresses transmitted through the ply layer located adjacent the barrier layer on the side opposite that of the innerliner.

Traditionally, the risk of insufficient barrier layer to protect the innerliner resulted in the necessity of fabricating a dimensionally thicker barrier layer which could better resist the stresses encountered during manufacturing that reduce its gauge. Though a thicker barrier layer would aid in maintaining the necessary cured gauge to provide protection to the innerliner in service, the increased dimension of the barrier layer also requires more material, resulting in higher tire cost, hysteresis, and weight.

The barrier layer composition described herein incorporates at least one carbon-carbon crosslinking material. This material is generally described as a 4-phenyl isocyanate. Good results have been obtained when incorporating methylene bis (4-phenyl isocyanate) into the formulation. This particular material is commercially available as Novor 950, from Elgem Technology, Brickendonbury, Hertford, United Kingdom.

The carbon-carbon crosslinking material is believed also to supply a measure of reversion resistance to the barrier layer. The cured barrier layer has better aged compound property retention and heat resistant performance, especially improved flexibility properties during service life. The compounder in turn is able to prepare thinner dimension barrier layers, resulting in cost and finished tire weight savings. Sulfur (or a sulfur donor) crosslinking material is also incorporated in conjunction with the carbon-carbon crosslinking material.

DETAILED DESCRIPTION OF THE INVENTION

Described herein is a method for improving green strength while maintaining cured flex life properties in a rubber composition for manufacturing a barrier layer for a pneumatic tire comprising incorporating into an elastomeric material selected from the group consisting of natural rubber, styrene-butadiene rubber, polybutadiene rubber, halobutyl rubber, and mixtures thereof; a mixture of a 4-phenyl isocyanate and a sulfur crosslinking material in an amount sufficient to effect carbon-carbon and sulfur-sulfur crosslinking, and a reinforcing material. The composition carbon-sulfur permits higher loading of reinforcing material, at a concentration of at least 60 parts per hundred of rubber. Where carbon black is incorporated into the barrier layer composition, the concentration levels of carbon black will be at least 45 phr. The 4-phenyl isocyanate and sulfur crosslinking material is incorporated into the elastomeric material in a ratio by weight of 50:50 to 95:5, preferably 70:30 to 90:10.

Examples of rubbers for use in the present invention include substituted and unsubstituted, saturated and unsaturated, natural and synthetic polymers. The natural polymers include natural rubber in its various forms, e.g., pale crepe and smoked sheet, and balata and gutta percha. In a preferred aspect, the rubber is natural rubber or a blend of natural rubber and synthetic rubber. The synthetic polymers are derived from a diene monomer and include those prepared from a single monomer (homopolymer) or a mixture of two or more copolymerizable monomers (copolymer) when the monomers are combined in the random distribution or block form styrene-butadiene rubber, polybutadiene rubber, halobutyl rubber, and mixtures thereof.

The preferred synthetic rubbers which may be used with the present invention are polybutadiene, polychloroprene, and copolymers of styrene and butadiene and blends thereof. When the compounds of the present invention are used as a barrier layer composition, natural rubber is preferably present and may even be partially replaced with some synthetic rubber. When used as a blend, the natural rubber is preferably present in an amount ranging from 5 to 95 weight percent of the total rubber present in the barrier layer composition.

Conventional rubber additives may be incorporated in the rubber stock of the present invention. The additives commonly used in rubber stocks include fillers, plasticizers, waxes, processing oils, retarders, antiozonants, antioxidants and the like. Reinforcing materials include precipitated silica and carbon black. Representative examples of such carbon blacks include N110, N121, N220, N231, N234, N242, N293, N299, S315, N326, N330, N332, N339, N343, N347 N351, N358, N375, N539, N550, N582, N630, N642, N650, N683, N754, N762, N765, N774, N787, N907, N908, N990 and N991. These carbon blacks have iodine absorptions ranging from 9 to 145 g/kg and a DBP No. ranging from 34 to 150 $cm^3/100$ g.

The commonly employed siliceous pigment used in rubber compounding applications can be used as the silica in this invention, including pyrogenic and precipitated siliceous pigments (silica), although precipitated silicas are preferred. The siliceous pigments which might be employed in this invention are preferably precipitated silicas such as, for example, those obtained by the acidification of a soluble silicate, e.g., sodium silicate.

The precipitated silica may have, for example, a BET surface area of the pigment, as measured using nitrogen gas in a range of about 80 to about 300, although more usually in a range of about 100 to about 200, although perhaps even up to about 360, square meters per gram. The BET method of measuring surface area is described in the *Journal of the American Chemical Society*, Volume 60, page 304, (1930).

The precipitated silica may have, for example, a dibutylphthalate (DBT) absorption value in a range of about 150 to about 350, and usually about 200 to about 300 cc/100 gm.

Various commercially available silicas may be considered, such as, for example only and without limitation, silicas commercially available from PPG Industries under the Hi-Sil trademark with designations 210,243, etc.; silicas available from Rhodia, such as, for example, Zeosil 1165MP and silicas available from Degussa AG with designations such as, for example, VN2, VN3, BV 3370GR and silicas from J. M. Huber Company, such as, for example, Hubersil 8745.

Plasticizers are conventionally used in amounts ranging from about 2 to about 40 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutylphthalate and tricresol phosphate. Common waxes which may be used include paraffinic waxes and microcrystalline blends. Such waxes are used in amounts ranging from about 0.5 to 3 phr. Materials used in compounding which function as an accelerator-activator include metal oxides such as zinc oxide and magnesium oxide which are used in conjunction with acidic materials such as fatty acid, for example, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

The barrier layer composition is preferably formulated by incorporating natural rubber therein, preferably in a weight percentage of at least 80% of the total elastomer concentration, up to and including 100% of the elastomer concentration. It is, however, anticipated that other elastomeric materials, such as cis 1,4-polybutadiene rubber, styrene-butadiene rubber and other rubbers derived from a diene monomer can be utilized in formulating the barrier layer composition, as well as mixtures of these elastomeric materials.

The sulfur crosslinking material is typically sulfur, though other sulfur based materials commonly used to provide a crosslinking function within the rubber matrix may be used. The 4-phenyl isocyanate material used as a carbon-carbon crosslinking material is preferably methylene bis (4-phenyl isocyanate). The concentration of 4-phenyl isocyanate in the composition is in a range of 2 to 6 phr, preferably 3 to 5 phr.

The barrier layer composition of the invention is characterized by having a higher green strength and viscosity during tire manufacturing, which better maintains its uncured gauge during tire manufacturing and without an unacceptable loss of cured compound performance properties, particularly aged flex life. The barrier layer composition green strength is substantially greater, on the order of 200%-700% greater than typically encountered. Green strength measurements at 120% modulus are achieved of at least 1.5 dNm. Even so, aged flex life properties are excellent, on the order of 30,000 flexing cycles or more for a 5 day oven aged sample at 100°C.

As an ancillary benefit, the improved aged compound property retention of these compositions may potentially allow the barrier layer prepared from this composition to be dimensionally thinner than presently configured, in turn leading to both cost savings in the use of fewer materials for the barrier layer and weight savings in the built tire.

In evaluating the properties of various barrier layer formulations, the green strength was determined using an Instron machine which was equipped with a "C" load cell that was operated at a crosshead speed of 20 inches per minute (50.8 cm/minute). Samples were prepared from milled uncured stock which was 0.05 inches (0.127 cm) thick that was enclosed in holland paper. Test specimens which were 6 inches (15.24 cm) long and 0.5 inch (1.27 cm) wide were died out of the samples. The holland paper was carefully removed from the test specimens prior to testing in order to avoid pre-stressing. The average thickness of the test specimens was determined with a dial micrometer gauge to the nearest 0.001 inch (0.00254 cm). The test specimens were then tested using a 1 inch (2.54 cm) jaw space. The tensile strength and elongation were determined based upon the original cross-section area of the uncured test specimen.

In connection with evaluating the fatigue characteristics of cured material, fatigue testing was conducted on dumbbell shape test specimens. The specimens were cyclically strained at a fixed frequency under a series of fixed maximum extension ratios such that little or no temperature rise was induced. As a result of the cyclical straining action, known as flexing, cracks usually initiated at a naturally occurring flaw grew and ultimately caused a complete rupture. Generally, the number of cycles to rupture (fatigue life) was recorded. To conduct the test, cured milled sheet was cut, and the cut samples were run at 1.7 plus or minus 0.2 Hz cycle time. The samples were stretched to about 140% and the fatigue testing was run for an initial 10 minute period after which the sample was set to a minimum crosshead separation. After a rest period of 10 minutes, the slack was removed from all samples between the grips on the fatigue tester, and samples were cycled until broken, or the sample reached 1,000,000 cycles.

Reversion resistance was measured by evaluation of the change from maximum torque while curing a sample for 60 minutes at 170°C. in an Alpha Technologies, Moving Die Rheometer.

The barrier layer formulations and test results are set out in the tables below. Concentrations of the formulation components are referenced to the rubber material employed therein, and set out as parts per hundred of rubber (phr).

TABLE 1

| | Formulation | |
|---|---|---|
| Material | Control | Experimental |
| Natural rubber | 100 | 100 |
| Carbon black (HS/HAF N-347) | 57 | 55 |
| Hydrated silica, surface area (BET absorption) 120-180 m²/g | 10 | 15 |
| Zinc oxide | 8.0 | 12 |
| Anti-oxidants | 2.5 | 2.5 |
| Methylene bis (4-phenyl isocyanate) | 0.0 | 4.2 |
| Process oils and stearic acid | 4 | 3.5 |
| Phenol formaldehyde resin | 0 | 3 |
| Sulfur | 4 | 0.4 |
| Zn tetrabenzyl thiuram disulfite | 0.0 | 0.3 |
| Tetra methyl thiuram monosulfide | 0.0 | 0.3 |
| N-tert-butyl-2-benzothiazole sulfenamide | 0.7 | 0.0 |

Comparison testing of the above two samples was conducted. Uncured samples were evaluated for green strength, and cured samples were tested for both aged flex life and reversion resistance. The data relating to each of these evaluations are set out below in Table 2.

TABLE 2

| Test Results | | |
|---|---|---|
| | Test Specimen | |
| Test | Control | Experimental |
| Aged cyclic flex cycles | 138 | 42800 |
| Ln aged cyclic flex cycles | 4.9 | 10.6 |
| Aged hot pierced groove flex mm/min growth rate | 1.66 | 0.0355 |
| Green strength dNm @ 120% modulus | 0.426 | 2.379 |
| Green strength percent elongation | 740 | 317 |
| Viscosity @ 135 C RPA dNm @ 0.083 Hz | 0.096 | 0.1893 |
| Shear torque dNm drop % | 37.56 | 18.88 |
| Tangent delta dNm rise % | 76.47 | 1.18 |
| Aged molded groove trouser tear dNm | 6.4 | 10.7 |

As the data indicate, the Experimental formulation containing a higher loading of carbon black and in the presence of methylene bis (4-phenyl isocyanate) crosslinking material was substantially less likely to develop flex cracks and had a substantially greater green strength modulus, while also demonstrating improved anti-reversion resistance and aged tear properties. Thus, compared to the Control, the Experimental formulation was less likely to deform during the building process pre-cure, and more likely to retain flexibility and tear strength over its service life post-cure.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative methods and illustrative examples shown and described. Accordingly, departures may be made from such details without departing from the scope or spirit of applicant's general inventive concept.

What is claimed is:

1. A method for improving uncured green strength while maintaining cured aged flex life and aged tear properties in a rubber composition for manufacturing a barrier layer, comprising:
   incorporating into an elastomeric material selected from the group consisting of natural rubber, styrene-butadiene rubber, polybutadiene rubber, halobutyl rubber, and mixtures thereof, a mixture of a 4-phenyl isocyanate and a sulfur crosslinking material in an amount sufficient to effect carbon-carbon, carbon-sulfur, and sulfur-sulfur crosslinking; and a reinforcing material.

2. The method of claim 1 wherein the 4-phenyl isocyanate and the sulfur crosslinking material is incorporated into the elastomeric material in a ratio by weight of 70:30 to 90:10.

3. The method of claim 1, wherein the 4-phenyl isocyanate is methylene bis (4-phenyl isocyanate).

4. The method of claim 1 wherein the reinforcing material is selected from the group consisting of carbon black, silica, and mixtures thereof.

5. The method of claim 4 wherein the reinforcing material concentration is at least 60 parts per hundred of rubber.

6. The method of claim 4 wherein the reinforcing material comprises carbon black in a concentration of at least 45 parts per hundred of rubber.

7. The method of claim 1 wherein the rubber composition has a pre-cure green strength measurement of at least 1.5 dNm at 120% modulus.

8. The method of claim 1 wherein the rubber composition has a post-cure aged flex life measurement of at least 30,000 cycles.

9. The method of claim 1 wherein the rubber composition has a torque drop percentage measurement of less than 20%.

10. A barrier layer composition for use in a pneumatic tire comprising:
    an elastomeric material selected from the group consisting of natural rubber, styrene-butadiene rubber, polybutadiene rubber, halobutyl rubber, and mixtures thereof;
    methylene bis (4-phenyl isocyanate) in a concentration of 2 to 6 parts per hundred of rubber;
    a sulfur crosslinking material in a weight ratio of 40:60 to 10:90 relative to the weight of methylene bis (4-phenyl isocyanate); and
    reinforcing material in a concentration of at least 60 parts per hundred of rubber.

11. The composition of claim 10 wherein the concentration of methylene bis (4-phenyl isocyanate) is 3 to 5 parts per hundred of rubber.

12. The composition of claim 10 wherein the reinforcing material is selected from the group consisting of carbon black, silica, and mixtures thereof.

13. The composition of claim 12 wherein the reinforcing material comprises carbon black in a concentration of least 45 parts per hundred of rubber.

14. The composition of claim 10 wherein the elastomeric material is at least 80% natural rubber by weight.

15. The composition of claim 10 wherein the elastomeric material is 100% natural rubber by weight.

16. A barrier layer composition for use in a pneumatic tire comprising:
    an elastomeric material selected from the group consisting of natural rubber;
    methylene bis (4-phenyl isocyanate) in a concentration of 3 to 5 parts per hundred of rubber;
    a sulfur crosslinking material in a weight ratio of 30:70 to 10:90 relative to the weight of the methylene bis (4-phenyl isocyanate); and
    at least 60 parts per hundred rubber of a reinforcing material selected from the group consisting of carbon black, silica, and mixtures thereof.

* * * * *

UNITED STATES PATENT AND TRADEMARK OFFICE
CERTIFICATE OF CORRECTION

PATENT NO. : 7,335,707 B2
APPLICATION NO. : 11/264861
DATED : February 26, 2008
INVENTOR(S) : Leighton Randolph Spadone It is certified that error appears in the above-identified patent and that said Letters Patent is hereby corrected as shown below:

COLUMN 3

Line 52, change "is" to --are--.

COLUMN 4

Line 67, change "I" to --1--.

COLUMN 5

Line 48, change "died" to --dried--.

COLUMN 7

Line 22, change "is" to --are--.

COLUMN 8

Line 21, after "of" insert --at--.

Signed and Sealed this

Sixteenth Day of December, 2008

JON W. DUDAS
*Director of the United States Patent and Trademark Office*